United States Patent
Speidel

(10) Patent No.: US 10,465,597 B2
(45) Date of Patent: Nov. 5, 2019

(54) CHARGE AIR COOLER ASSEMBLY

(71) Applicants: MANN+HUMMEL GMBH, Ludwigsburg (DE); Modine Manufacturing Company, Racine, WI (US)

(72) Inventor: Gerrit-Tobias Speidel, Ludwigsburg (DE)

(73) Assignees: MANN+HUMMEL GmbH, Ludwigsburg (DE); Modine Manufacturing Company, Racine, WI (US)

( * ) Notice: Subject to any disclaimer, the term of this patent is extended or adjusted under 35 U.S.C. 154(b) by 223 days.

(21) Appl. No.: 15/364,945

(22) Filed: Nov. 30, 2016

(65) Prior Publication Data

US 2017/0159550 A1    Jun. 8, 2017

(30) Foreign Application Priority Data

Dec. 2, 2015    (DE) .................. 10 2015 015 449

(51) Int. Cl.
  *F02B 29/04*    (2006.01)
  *F02M 35/10*    (2006.01)
  *F02M 35/104*    (2006.01)
  *F28F 9/00*    (2006.01)
  *F28D 21/00*    (2006.01)

(52) U.S. Cl.
  CPC ....... *F02B 29/0475* (2013.01); *F02M 35/104* (2013.01); *F02M 35/10268* (2013.01); *F02M 35/10321* (2013.01); *F02M 35/10327* (2013.01); *F28F 9/002* (2013.01); *F28D 2021/0082* (2013.01)

(58) Field of Classification Search
  CPC .......... F02B 29/0475; F28D 2021/0082; F28F 2225/02; F28F 2225/08; F28F 9/00; F28F 2275/14
  USPC ........................................................ 123/563
  See application file for complete search history.

(56) References Cited

U.S. PATENT DOCUMENTS

| | | | |
|---|---|---|---|
| 6,315,257 | B1 | 11/2001 | Fennesz |
| 8,967,235 | B2 * | 3/2015 | Baumann .............. F28D 7/1692 165/103 |
| 9,097,466 | B2 * | 8/2015 | Braic .................... F28D 7/1692 |
| 9,605,586 | B2 * | 3/2017 | Saumweber ........ F02B 29/0462 |

(Continued)

FOREIGN PATENT DOCUMENTS

DE    102013002478 A1    8/2014

*Primary Examiner* — Thai Ba Trieu
*Assistant Examiner* — Edward Bushard
(74) *Attorney, Agent, or Firm* — James Hasselbeck

(57) ABSTRACT

An intake manifold of an internal combustion engine includes a non-metal housing and at least one charge air cooler. The non-metal housing has at least one inlet and at least one outlet for charge air. The at least one charge air cooler disposed in the housing between the at least one inlet and at least one outlet. A metal housing frame is carried by the at least one charge air cooler. A metal adapter holding plate is secured to the metal housing frame and holds at least one non-metal mounting adapter to the at least one charge air cooler. The at least one non-metal mounting adapter may be secured to a top interior side wall and a bottom interior side wall the non-metal housing. The metal adapter holding plate is elongated in a direction extending from the inlet to the outlet and has a U-shape profile.

12 Claims, 4 Drawing Sheets

(56) References Cited

U.S. PATENT DOCUMENTS

| | | | | |
|---|---|---|---|---|
| 9,671,168 B2* | 6/2017 | Gluck | ................... | B21D 53/04 |
| 9,835,080 B2* | 12/2017 | Bauer | ................ | F02B 29/0462 |
| 10,012,135 B2* | 7/2018 | Speidel | ................... | F02B 37/00 |
| 2009/0013710 A1 | 1/2009 | Cho et al. | | |
| 2012/0152212 A1* | 6/2012 | Bauer | ................ | F02B 29/0462 |
| | | | | 123/542 |
| 2012/0285423 A1* | 11/2012 | Nguyen | .............. | F02B 29/0475 |
| | | | | 123/542 |
| 2014/0130764 A1* | 5/2014 | Saumweber | .......... | F02B 29/045 |
| | | | | 123/184.21 |
| 2014/0224458 A1* | 8/2014 | Dornseif | ................... | F28F 9/02 |
| | | | | 165/157 |
| 2014/0299295 A1* | 10/2014 | Kalbacher | ................ | F28F 9/26 |
| | | | | 165/76 |
| 2014/0311143 A1* | 10/2014 | Speidel | ................... | F02B 37/00 |
| | | | | 60/599 |
| 2014/0345577 A1* | 11/2014 | Meshenky | ........... | F02M 35/112 |
| | | | | 123/542 |
| 2015/0083091 A1* | 3/2015 | Fehrenbach | .......... | F28D 7/1692 |
| | | | | 123/542 |
| 2015/0129168 A1* | 5/2015 | Odillard | ................... | F28F 9/002 |
| | | | | 165/71 |
| 2015/0168076 A1* | 6/2015 | Ferlay | ................... | F28D 9/0062 |
| | | | | 165/166 |
| 2015/0184952 A1* | 7/2015 | Ignjatovic | ........... | F02B 29/0425 |
| | | | | 165/158 |
| 2015/0198082 A1* | 7/2015 | Pugh | ................... | F02B 29/0462 |
| | | | | 60/599 |
| 2015/0204234 A1* | 7/2015 | Bauer | ................ | F02B 29/0462 |
| | | | | 60/599 |
| 2016/0177881 A1* | 6/2016 | Wicks | .............. | F02M 35/10268 |
| | | | | 123/568.12 |
| 2017/0016685 A1* | 1/2017 | Hohmann | ........... | F02B 29/0475 |

* cited by examiner

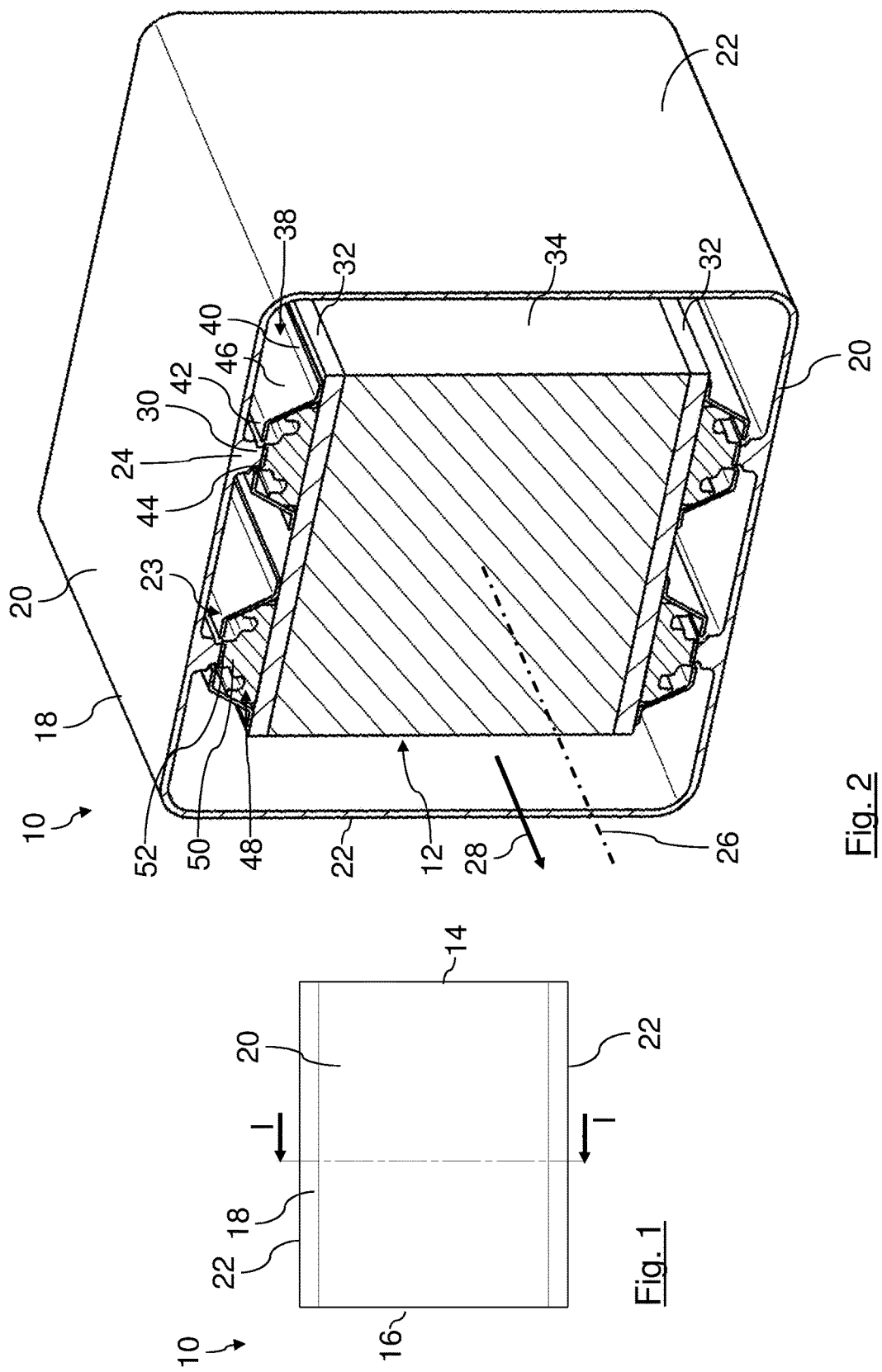

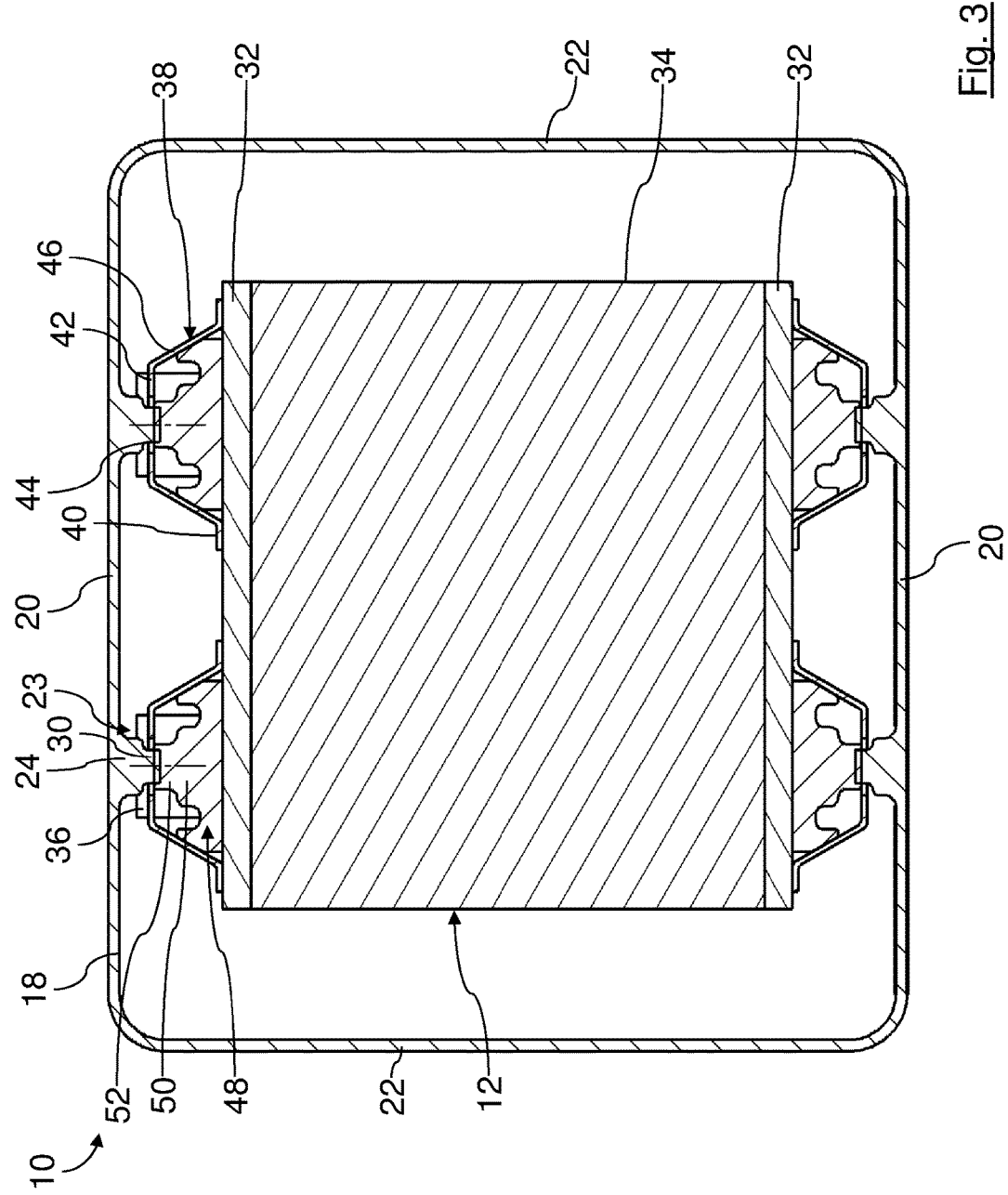

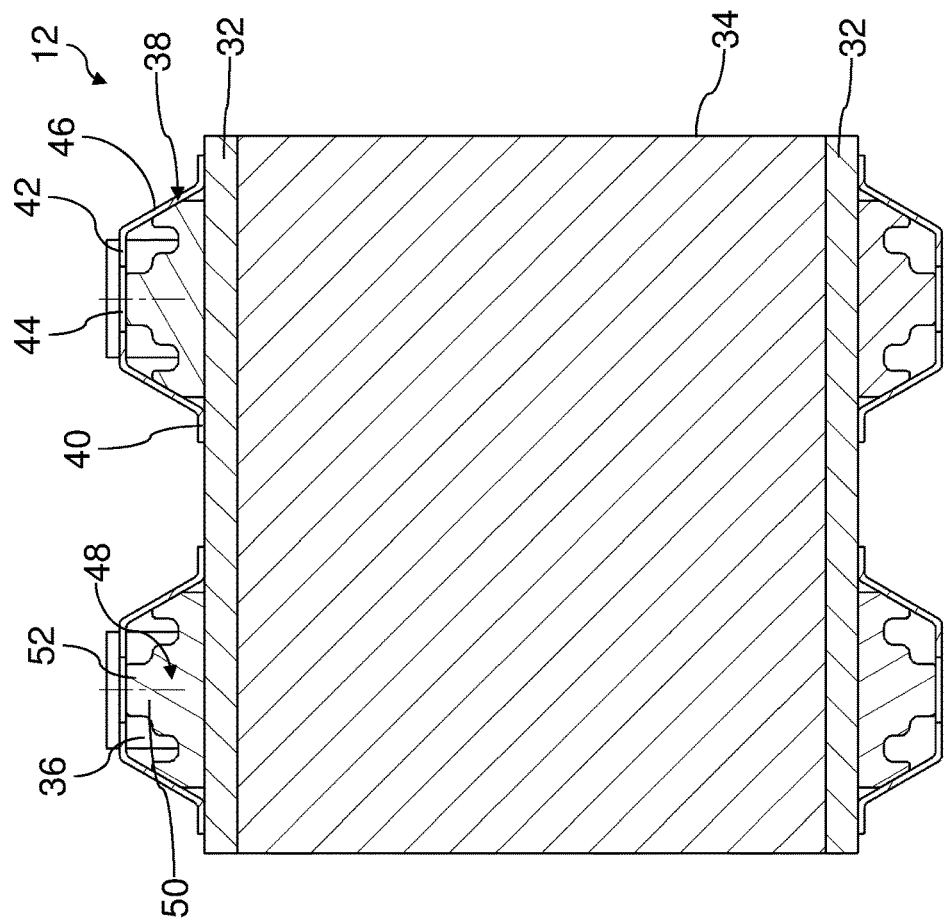
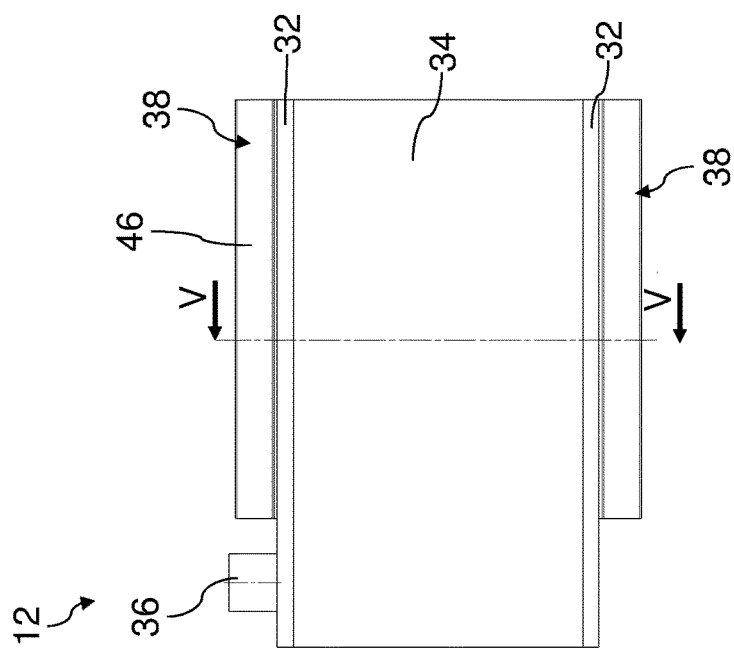

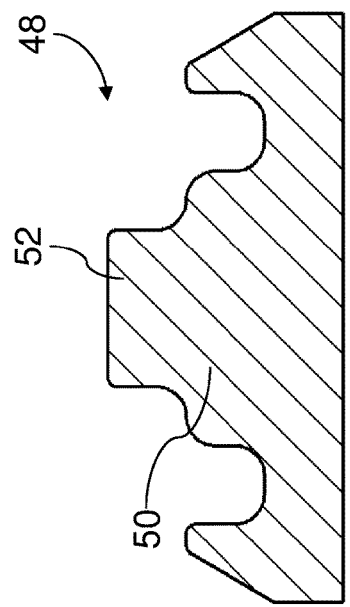
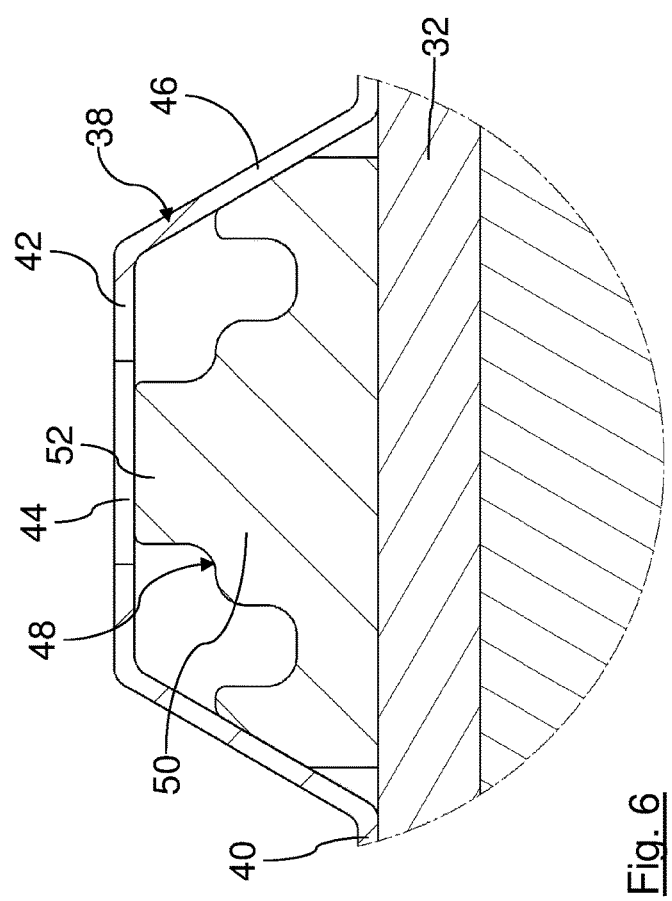
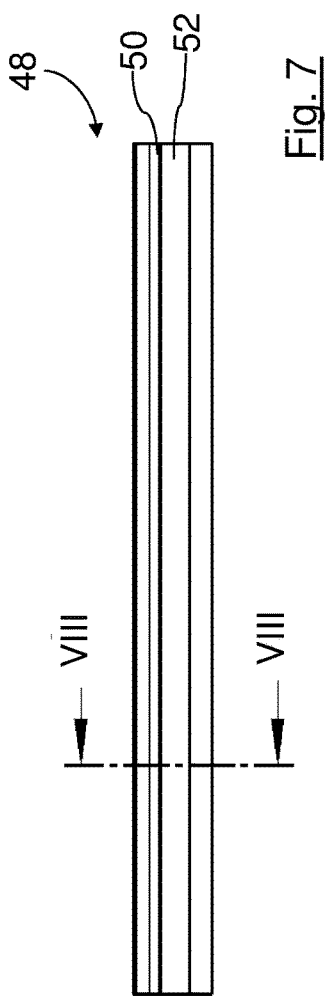

CHARGE AIR COOLER ASSEMBLY

TECHNICAL FIELD

The invention relates to an air-conveying component, in particular an intake manifold, of an intake duct of a charged, in particular turbocharged, internal combustion engine, in particular of a motor vehicle, with at least one charge air cooler arranged therein, wherein the air-conveying component has at least one inlet and at least one outlet for charge air and the at least one charge air cooler is arranged so that air can flow through it and/or to it, in a housing part of the air-conveying component between the at least one inlet and the at least one outlet for the charge air.

Furthermore, the invention relates to a charge air cooler of an air-conveying component, in particular an intake manifold, of an intake duct of a charged, in particular turbocharged, internal combustion engine, in particular of a motor vehicle, wherein the charge air cooler can be arranged so that air can flow through it and/or to it, in a housing part of the air-conveying component between at least one inlet and at least one outlet for the charge air.

BACKGROUND

A charge air cooler is integrated in an air-conveying component, also known as an air distributor or intake manifold, which is known on the market or from DE 10 2013 006 956 A1, of a charged spark ignition engine. The charge air cooler serves to cool the charge air, which is compressed by a turbocharger of the spark ignition engine and is fed to the spark ignition engine for combustion. In this case the charge air cooler is inserted between two half-shells of the intake manifold and is then integrated into the component by welding of the shells. The intake manifold has an inlet for the charge air through which compressed charge air is fed to the intake manifold. Moreover, the intake manifold has a plurality of outlet pipes, which are connected to respective air inlets of a cylinder head of the spark ignition engine.

In the case of indirect charge air cooling, the compressed intake air is cooled by a coolant, which in turn is cooled through the surrounding ambient air. An indirect charge air cooler can be arranged near the engine in an air-conveying component which is placed between a compressor and a throttle valve. If the indirect charge air cooling is arranged in an intake manifold, the person skilled in the art refers to this as an integrated charge air cooler.

SUMMARY

The object of the invention is to provide an air-conveying component and a charge air cooler of the type referred to above, in which the stability of the air-conveying component can be improved and/or positioning and/or fixing of the at least one charge air cooler in the component can be improved and/or simplified.

This object is achieved according to the invention in that the at least one charge air cooler is fastened by means of at least one adapter device to at least one wall section of a housing part, wherein at least one frame part of the charge air cooler facing the wall portion has at least one adapter holding part of the at least one adapter device which holds at least one adapter element of the at least one adapter device by non-positive and/or positive engagement, wherein the at least one adapter element is connected at least cohesively to the at least one wall portion.

According to the invention at least one adapter device is provided, by which the at least one charge air cooler is fastened in the air-conveying component. The at least one adapter device enables a connection in particular of different materials and/or forms of the air-conveying component and of the at least one charge air cooler. Furthermore, with the at least one adapter device different types of fastening, in particular cohesive connections, on the one hand, and non-positive and/or positive connections, on the other hand, can be combined with one another.

A cohesive connection can be achieved in particular by means of a welded connection, a soldered joint, an adhesive joint or a combination of different bonded types of connection. A welded connection can be achieved in particular by means of a vibration welding process, hot gas welding process, heated plate welding process, infrared welding process or the like.

The at least one adapter element with the at least one adapter holding part is held on the side of the at least one charge air cooler at least by non-positive and/or by positive engagement. In this case the at least one adapter element can be held exclusively by non-positive engagement or exclusively by positive engagement or by a combination of both types of connection. In this way the at least one adapter element can be connected to the at least one frame part even when the materials of the two components can only be connected to one another impermanently by means of a cohesive connection. However, the at least one adapter element can also be additionally connected cohesively to the at least one adapter holding part.

On the side of the housing part the at least one adapter element is at least cohesively connected to the at least one wall portion. In this case the at least one adapter element can be connected exclusively cohesively to the at least one wall portion. In addition to the cohesive connection, the at least one adapter element can also be connected to the at least one wall portion in a different way, in particular by non-positive and/or positive engagement.

Advantageously the at least one adapter element and/or the at least one wall portion can have at least one fastening portion, to which the respective other component, in particular at least one fastening portion there, can be cohesively connected. At least one fastening portion can have at least one anvil or can at least be formed therewith. A cohesive weld can be simply implemented with an anvil, in particular two abutting anvils.

In particular according to the invention the at least one wall portion and the at least one frame part can also be fastened to one another if at least in their respective fastening zones they are made of at least one material, in particular different materials, which cannot be connected to one another cohesively, in particular not permanently and/or fixedly.

Advantageously one or more adapter holding parts can be arranged on a side of the at least one charge air cooler, in particular on a frame part or frame section. A plurality of adapter holding parts can be arranged on different, in particular opposing, sides of the charge air cooler, in particular opposing frame parts or frame portions.

The at least one charge air cooler can have in particular a multipart frame composed of corresponding frame parts. Alternatively, at least two frame parts can be integrally connected to one another.

Advantageously at least one frame part, in particular the frame, can extend peripherally and contiguously around the charge air cooler. In this way the at least one frame part, in particular the frame, can be fastened on opposing sides to the housing part. Thus corresponding holding forces can be transmitted uniformly between the at least one frame part, in particular the frame, and the housing part.

The air-conveying component can advantageously be in one piece. In this case the at least one charge air cooler can be introduced through an opening, in particular at least one inlet or at least one outlet, which is in any case present in the air-conveying component into the interior of the housing part and accordingly can be connected, at least cohesively, to the at least one adapter holding part and the corresponding wall portion.

Alternatively the air-conveying component, in particular the housing part, can be constructed in multiple parts. In this way during production the at least one charge air cooler can be introduced into a part of the air-conveying component, in particular an intake manifold shell. In this case the corresponding adapter elements can be connected at least cohesively to the corresponding wall portions of this part. Then at least a further part, in particular a further intake manifold shell, can be connected to the first part of the air-conveying component. In this case further adapter holding parts of the charge air cooler can be connected at least cohesively to the corresponding wall portions of the further part. Alternatively, after the joining of the parts of the air-conveying component, these further adapter holding parts of the charge air cooler can also be connected at least cohesively in a subsequent operating step.

The air-conveying component, in particular the intake manifold, can advantageously be connected to at least one inlet directly or indirectly, in particular by means of a throttle valve, to an arrangement for compression of the charge air, in particular an outlet of a compressor of a turbocharger. Alternatively the component can also have a plurality of inlets.

Advantageously the air-conveying component can be connected to at least one outlet directly or indirectly to at least one air inlet in particular on a cylinder head of the internal combustion engine. Alternatively the air-conveying component can have a plurality of outlets. In particular the component can have an outlet for each cylinder of the internal combustion engine. Thus with the air-conveying component the compressed charge air cooled by the at least one charge air cooler can be distributed to the corresponding cylinders of the internal combustion engine.

The at least one frame part, possibly the frame, can support and/or surround and/or hold corresponding cooling arrangements, in particular coolant conduits, preferably coolant pipes or plates and/or cooling fins, of the at least one charge air cooler.

Advantageously at least a frame part of at least one part of at least one corresponding cooling arrangement, in particular at least a coolant conduit, preferably at least a coolant pipe or a coolant plate and/or a cooling fin, of the at least one charge air cooler can be formed at least as part thereof. In this way it is possible to dispense with corresponding separate components in order to form the frame part. At least one adapter holding part can advantageously be connected directly to at least one part of at least one corresponding cooling arrangement acting as a frame part.

The at least one charge air cooler can advantageously be implemented as plate or pipe coolers. Another type of charge air cooler can also be provided.

The at least one charge air cooler can advantageously be a so-called water/air charge air cooler. In this case water is used as coolant. The at least one charge air cooler can also be configured for another type of liquid coolant. Alternatively, at least one charge air cooler can be configured as an air/air charge air filter or for use of another type of gaseous coolant.

The at least one charge air cooler can advantageously have at least one coolant connection for feed conduits and/or discharge conduit for the coolant used, in particular water or air.

The air-conveying component, in particular the housing part of the intake manifold in which the at least one charge air filter is arranged, can advantageously have at least one passage for at least one coolant connection for the coolant used.

Advantageously the air-conveying component can be used in conjunction with an internal combustion engine of a motor vehicle. However, the invention can also be used outside automotive engineering, in particular in industrial motors.

Advantageously the invention can be employed in conjunction with a turbocharged internal combustion engine. However, it can also be employed in conjunction with another type of charged internal combustion engine.

In an advantageous embodiment the at least one adapter holding part can be connected cohesively, in particular by means of a soldered joint, welded connection and/or adhesive joint, and/or by positive engagement and/or by non-positive engagement to the at least one frame part. In this way the at least one adapter holding part can be connected in a stable manner to the at least one frame part. Thus the at least one adapter holding part can be simply pre-installed. In the final installation the at least one adapter element can be connected to the pre-installed at least one adapter holding part.

Advantageously the at least one adapter holding part can be connected exclusively cohesively to the at least one frame part. A stable fixing can be simply achieved by means of a cohesive connection.

Advantageously the at least one adapter holding part can be connected cohesively to at least one frame part by means of a soldered joint, a welded joint and/or adhesive joint.

The connection between the at least one adapter holding part and the at least one frame part may be punctiform, linear or planar.

Advantageously the at least one adapter holding part can be connected to the at least one frame part by positive and/or non-positive engagement.

Alternatively the at least one adapter holding part can be connected in one piece to the at least one frame part. Thus during production it can be fabricated, in particular shaped together with the at least one frame part.

In a further advantageous embodiment the at least one adapter holding part can have at least one guide portion by which the at least one adapter element can be guided as it is brought together with the at least one adapter holding part, in particular pushing in or fitting to/in/on the at least one adapter holding part. In this way the at least one adapter holding part can be brought in a controlled and precise manner into its correct end position.

Advantageously the at least one adapter holding part and the at least one guide portion can be straight. In this way the at least one adapter holding part can be simply pushed in a straight line into or onto the at least one guide portion.

Advantageously the at least one adapter holding part and/or the at least one adapter element can have at least one path limiting means, in particular a stop device, by which, when the end position is reached, a further movement of the at least one adapter element relative to the at least one adapter holding part can be prevented.

Advantageously the at least one adapter holding part and/or the at least one adapter element can have at least one fixing means, in particular a latching means, by which the at least one adapter element can be fixed in its end position in or on the at least one adapter holding part.

In a further advantageous embodiment the at least one adapter holding part can have at least one particularly elongated opening, through which at least one fastening portion of the at least one wall portion and/or of the at least one adapter element can protrude at least partially. In this way the at least one adapter element can be arranged on one side of at least one corresponding portion, in particular a tension portion, of the adapter holding part. The at least one wall portion can be arranged on the opposing side of this at least one portion, in particular a tension portion. Thus the at least one adapter holding part can transmit tensile forces between the at least one frame part of the at least one charge air cooler and the at least one wall portion of the housing. In this case the at least one adapter element and the at least one wall portion can be connected to one another cohesively by means of their respective fastening portions through the at least one opening in the at least one corresponding portion, in particular the at least one tension portion, of the at least one adapter holding part.

The at least one opening can advantageously be elongated. In this way a connecting surface between the corresponding fastening portions of the at least one adapter element and the at least one wall portion can be increased. Thus the connection can be more resilient in particular against tensile forces.

The elongated opening can advantageously be straight. Thus an at least cohesive connection between the fastening portions of the at least one adapter element and of the at least one wall portion can be implemented more simply.

In a further advantageous embodiment the at least one adapter holding part can have at least one tension portion, which can at least partially engage around the at least one adapter element at least on the side facing the at least one wall portion. The at least one adapter holding part can be implemented and/or can act as a type of tension anchor. The at least one tension portion can be arranged between the at least one adapter element and the at least one wall portion, so that tensile forces between the at least one wall portion can be transmitted by means of the at least one adapter element and the at least one tension portion of the at least one adapter holding part to the at least one frame part of the at least one charge air cooler.

Advantageously two tension portions can engage around the at least one adapter element on opposing sides of at least one corresponding fastening portion when viewed transversely with respect to the tensile direction.

Advantageously at least one tension portion can extend on opposing sides of at least one particularly elongated opening, through which the at least one fastening portion can protrude at least partially. At least one particularly elongated opening can be implemented in the at least one tension portion.

In a further advantageous embodiment the at least one adapter holding part can have at least one connecting portion, in particular a connecting piece, by which the at least one adapter element can be connected to the at least one frame part. Advantageously the at least one connecting portion can possibly be connected, directly or indirectly, in one piece or in multiple parts, to at least one corresponding tension portion. In particular, tensile forces from the at least one adapter element can be uniformly introduced into the at least one frame part of the charge air cooler and vice versa by means of the at least one connecting portion.

Advantageously the at least one connecting portion can have at least one connecting piece. The at least one connecting piece can advantageously extend along, in particular parallel to, a surface of the at least one frame part. Thus the at least one connecting portion can be planar and/or uniformly connected to the at least one frame part.

Advantageously the at least one adapter holding part can have an approximately U-shaped profile. In this case at least one arm of the U-shaped profile can have at least one connecting portion, in particular a connecting piece, on its free ends. In this connection at least one arm can be correspondingly bent outwards or inwards. The closed side of the U-shaped profile can have at least one particularly elongated opening, through which at least one fastening portion can protrude. The closed side of the U-shaped profile can have or form at least one tension portion of the at least one adapter holding part.

Advantageously the at least one adapter holding part can be formed, in particular bent, cast and/or injection molded, from one piece.

In a further advantageous embodiment the at least one adapter element can have at least one rail portion, in particular a profiled rail portion, or a rail, in particular a profiled rail. A rail portion, in particular a rail, can be simply pushed into or onto a corresponding straight adapter holding part. Furthermore, a particularly planar and/or uniform connection between the at least one wall portion of the housing part and/or the at least one frame part of the charge air cooler can be implemented by means of a rail or a rail portion over a corresponding elongated expanse. Thus corresponding forces, in particular tensile forces, can be simply transmitted between the connected components.

Advantageously the at least one adapter element can have a profiled rail portion, or may be a rail. In this case the profile can be adapted to a corresponding profile of the at least one adapter holding part. In particular at least one fastening portion of the at least one adapter element can form a part of the profile. A corresponding holding section can form a further part of the profile. With the at least one adapter element fitted, for transmission of forces the at least one holding portion can co-operate with the at least one adapter holding part, in particular possibly at least one tension portion and/or at least one guide portion.

In a further advantageous embodiment at least one fastening portion of the at least one adapter element, in particular in the form of a rail, can be elongated. In this way a correspondingly elongated, in particular planar, cohesive connection can be implemented between the at least one adapter element and the at least one wall portion, in particular at least one corresponding fastening portion, of the housing part. Thus a more uniform transmission of forces can be implemented over a larger area.

Advantageously an elongated adapter holding part and/or a corresponding adapter element can extend parallel, perpendicular or obliquely with respect to a through flow direction of the charge air cooler.

In a further advantageous embodiment the at least one adapter element and the at least one wall portion can be made at least partially of materials or may include such materials which can be cohesively connected to one another, in particular at least one fastening portion of the at least one wall portion and at least one fastening portion of the at least one adapter element can include or consist of plastic, in particular the same plastic. In this way the materials used can be directly cohesively connected to one another. When the same materials are used a particularly stable connection can be achieved. Moreover, the connection process can be implemented more simply.

In a further advantageous embodiment the at least one frame part of the charge air cooler and/or the at least one adapter holding part can include or consist of metal, in particular aluminum, in particular the same metal. In this way the at least one frame part can be more stable and robust with respect to pressure fluctuations and/or fluctuations due to repairs.

The at least one frame part and the at least one adapter holding part can advantageously include or consist of the same material. Thus a connecting of the two components can take place in a simpler and more stable manner. The same materials can be connected to one another more simply, in particular by means of welding and soldering.

The at least one frame part and/or the at least one adapter holding part can advantageously include or consist of aluminum. Aluminum is a relatively lightweight and stable metal.

Advantageously at least one adapter holding part can include or consist of a sheet, in particular an aluminum sheet, soldered onto the corresponding frame part of the charge air cooler.

Furthermore, the object according to the invention is achieved in the charge air cooler in that the charge air cooler has at least one frame part, which can be fastened by means of at least one adapter device on at least one wall portion of the housing part, wherein the at least one frame part has at least one adapter holding part of the at least one adapter device, by which at least one adapter element of the at least one adapter device can be held at least by non-positive and/or positive engagement, wherein the at least one adapter element can be connected at least cohesively to at least one wall portion of the at least one housing part.

Moreover, the features and advantages demonstrated in connection with the air-conveying component according to the invention and the charge air cooler according to the invention and the respective advantageous embodiments thereof are applicable correspondingly amongst themselves and vice versa. It shall be readily understood that the individual features and advantages can be combined with one another, wherein other advantageous effects that go beyond the sum of the individual effects may emerge.

BRIEF DESCRIPTION OF THE DRAWINGS

Other advantages, features, and details of the invention shall be made more apparent by the following description, which addresses an embodiment of the invention in greater detail, with reference to the accompanying drawings. The features disclosed in the drawings, the description, and the claims in combination will be individually considered, as appropriate, and combined into other appropriate combinations by a person skilled in the art. In the schematic drawings:

FIG. 1 shows a plan view of a detail of an air-conveying component in the form of an intake manifold with integrated charge air cooler of an intake duct of a turbocharged internal combustion engine;

FIG. 2 shows an isometric representation of a cross-section of the intake manifold according to FIG. 1 along the section line I-I there;

FIG. 3 shows a front view of the cross-section of the intake manifold according to FIG. 2;

FIG. 4 shows a side view of the charge air cooler of the intake manifold according to FIGS. 1 to 3;

FIG. 5 shows a cross-section of the charge air cooler according to FIGS. 1 to 4 along the section line V-V according to FIG. 4;

FIG. 6 shows a view of a detail of the cross-section of the charge air cooler according to FIG. 5 in the region of an adapter device for fastening the charge air cooler to a housing part of the intake manifold;

FIG. 7 shows a plan view of an adapter element of the adapter device according to FIG. 6;

FIG. 8 shows a cross-section of the adapter element according to FIG. 7 along the section line VIII-VIII there.

In the drawings, like components are assigned like reference signs.

DETAILED DESCRIPTION

In FIG. 1 a detail of an intake manifold 10 with an integrated charge air cooler 12 is shown in plan view. FIGS. 2 and 3 show the detail of the intake manifold 10 in a cross-section. The intake manifold 10 is part of an air intake duct (otherwise not shown) of a turbocharged internal combustion engine of a motor vehicle. The intake manifold 10 connects an outlet of a compressor (not shown) of an exhaust gas turbocharger with a cylinder head of the internal combustion engine. The charge air cooler 12 serves to cool the compressed charge air.

The intake manifold 10 has an inlet 14 and an outlet 16 for the compressed charge air. The inlet 14 and the outlet 16 are merely indicated schematically in FIG. 2. The inlet 14 is connected to a throttle valve (not shown), which in turn is arranged in a connecting line to the compressor. The outlet 16 has a plurality of outlet pipes, which are not shown in the drawings for the sake of greater clarity. Each outlet pipe is assigned to a cylinder of the internal combustion engine.

The intake manifold 10 has a housing part 18. In the housing part 18 the charge air cooler 12 is arranged so that the compressed charge air can flow through it. The housing part 18 is made of weldable plastic. The housing part 18 has two opposing wall portions 20, at the top and bottom in FIGS. 2 and 3. The wall portions 20 are connected to one another, for example, by means of two opposing side wall portions 22.

The form of the intake manifold 10 is merely indicated schematically. The orientation of the intake manifold 10 in space is not essential for the invention. Thus, for example, the side wall portions 22 can also be located spatially at the top and at the bottom and instead the wall portions 20 can be located laterally.

The charge air cooler 12 is fastened in each case to two adapter devices 23 on each of the wall portions 20. On the inner faces facing one another the wall portions 20 have in each case two housing-side fastening portions 24 of the corresponding adapter device 23. The housing-side fastening portions 24 are connected integrally to the wall portions 20.

The housing-side fastening portions 24 are the same shape and size. The housing-side fastening portions 24 each have the shape of an elongated web which extends parallel to a longitudinal axis 26 of the intake manifold 10. The longitudinal axis 26 is indicated in FIG. 1. A through flow direction 28 of the charge air through the housing part 18 also extends parallel to the longitudinal axis 26. The housing-side fastening portions 24 extend in each case to the interior of the housing part 18. On their free sides facing the interior of the housing the housing-side fastening portions 24 are in each case graduated, so that in each case a housing-side anvil 30 which is elongated in the longitudinal axis 26 is formed there.

The charge air cooler 12 has two opposing frame parts 32 at the top and bottom in FIGS. 2 and 3. The frame parts 32 extend, for example, parallel to the wall portions 20. The frame parts 32 are in each case made of aluminum. The frame parts 32 are connected to one another by means of corresponding side part 34 of the charge air cooler 12.

Inside a frame formed by the frame parts 32 and the side parts 34 are located cooling ducts which are of no further interest here, around which the charge air flows as it flows through the charge air cooler 12 for heat exchange. A coolant, for example cooling water, flows through the cooling ducts. Corresponding coolant connections 36 are indicated in FIGS. 3 to 5. They lead through the upper frame part 32 in FIGS. 3 to 5.

Each of the frame parts 32 has two adapter holding parts 38 of the corresponding adapter devices 23. The adapter holding parts 38 are the same shape and size. The adapter holding parts 38 are in each case aluminum plates elongated in the direction of the longitudinal axis 26 and having approximately a U-shape profile. The free ends of the arms of the U-shaped profile are in each case bent outward to form connecting pieces 40. The connecting pieces 40 extend parallel to the corresponding facing surface of the corresponding frame part 32. The adapter holding parts 38 are soldered cohesively to the corresponding frame parts 32 along the connecting pieces 40.

The closed sides of the respective U-shaped profile of the adapter holding parts 38 opposite the connecting pieces 40 in each case form a tension portion 42. The tension portions 42 likewise extend parallel to the surfaces of the corresponding frame parts 32.

The tension portions 42 each have, approximately centrally, an opening 44 which is elongated in the direction of the longitudinal axis 26. The openings 44 have approximately the same dimensions such as the housing-side anvil 30 of the housing part 18. With the intake manifold 10 fitted, the openings 44 are aligned with the respective housing-side anvils 30. The anvils 30 protrude through the corresponding opening 44.

The arms of the U-shaped adapter holding parts 38 which connect the respective tension portion 42 to the corresponding connecting piece 40 form a respective guide portion 46 of the corresponding adapter holding part 38 on opposing sides. The guide portions 46 extend obliquely with respect to the surface of the frame parts 32, so that the adapter holding parts 38 taper away from the corresponding frame part 32.

The coolant connections 36 are situated in the upper frame part 32 in an extension of the adapter holding parts 38 there.

The tension portions 42, the guide portions 46 and the corresponding adjacent regions of the corresponding frame part 32 delimit an interior space of the respective adapter holding part 38. An adapter element 48 of the corresponding adapter device 23 is inserted in each case into the interior space.

The adapter elements 48 are made of the same plastic as the housing part 18. The adapter elements 48 are the same shape and size. They are each in the form of a profiled rail which is elongated in the direction of the longitudinal axis 24. The adapter elements 48 in each case lie in flat contact with their undersides on the surface of the corresponding frame part 32. The opposing long sides of the adapter element 48 extending in the direction of the longitudinal axis 26 extend corresponding to the guide portions 46 of the respective adapter holding parts 38 obliquely with respect to the undersides. On the top side facing away from the respective frame part 32 the adapter elements 48 in each case have a cooler-side fastening portion 50.

The sides of the cooler-side fastening portions 50 facing away from the frame part 32 in each case form a cooler-side anvil 52. The dimensions of the cooler-side anvil 52 in the direction of the longitudinal axis 26 and perpendicular to the longitudinal axis 26 are somewhat greater than the corresponding dimensions of the housing-side anvil 30. In the installed state in the respective adapter holding parts 38, the cooler-side anvils 52 are aligned with the openings 44 in the adapter holding parts 38. With the intake manifold 10 fitted, the cooler-side anvil 52 and the housing-side anvil 30 are integrally welded to one another.

For production of the intake manifold 10, first of all the individual components are prefabricated, wherein the sequence for the prefabrication is not essential to the invention. In this case the housing part 18 with the housing-side fastening portion 24 is prefabricated from plastic. The charge air cooler 12 comprising the frame part 32, the side part 34, the cooling duct and the coolant connections 36 is prefabricated. The adapter holding parts 38 are prefabricated from aluminum. The adapter elements 48 are prefabricated from the same plastic as the housing part 18.

The adapter holding parts 38 are in each case soldered with their connecting pieces 40 to the frame parts 32. The adapter elements 48 are inserted into the open sides of the adapter holding parts 38 opposing the coolant connections 36. The adapter elements 48 are guided between the corresponding guide portions 46. In the drawings stops (not shown) prevent the adapter elements 48 from being pushed out over their respective end positions in the adapter holding part 38. Fixing elements, which are likewise not shown, for example in the form of latching means, fix the adapter elements 48 in their respective end positions.

Then the charge air cooler 12 is introduced through the inlet 14 or the outlet 16 into the housing part 18. The housing-side anvils 30 are welded cohesively by means of hot gas welding to the corresponding cooler-side anvils 52. In this case the housing-side anvils 30 protrude through the openings 44 of the adapter holding parts 38.

Alternatively, the housing part 18 can be composed of two shells, for example an upper shell and a lower shell, similar to the illustration in FIGS. 2 and 3. In this case the charge air cooler 12 can be introduced into the lower shell and the corresponding lower anvils 30 and 52 can be connected to one another by means of hot gas welding. Then the upper shell can be arranged on the lower shell and welded thereto, and the corresponding upper anvils 30 and 52 can be connected to one another by means of hot gas welding.

What is claimed is:

1. An intake manifold of an internal combustion engine, the intake manifold comprising:
   a non-metal housing including at least one inlet and the at least one outlet for charge air;
   at least one charge air cooler disposed in the housing between the at least one inlet and at least one outlet;
   a metal housing frame carried by the at least one charge air cooler;
   at least one non-metal mounting adapter; and
   a metal adapter holding plate secured to the metal housing frame and holding the at least one non-metal mounting adapter to the at least one charge air cooler;
   wherein the at least one adapter element is secured to an adjacent interior side of a wall of the non-metal housing, and wherein the metal adapter holding plate is elongated in a direction extending from the at least one inlet to the at least one outlet and has a U-shape profile.

2. The intake manifold of claim 1,
wherein the U-shape profile of the metal adapter holding plate includes a tension portion formed between first and second connecting arms, and
wherein both of the first and second connecting arms are parallel to a corresponding facing surface of the frame and secured to the corresponding facing surface of the frame.

3. The intake manifold of claim 2, wherein the tension portion of the metal adapter holding plate includes a central portion receiving an inwardly protruding portion from the interior side wall of the non-metal housing to secure the non-metal mounting adapter.

4. The intake manifold of claim 1, wherein a first adapter element is secured to a top interior side wall of the no-metal housing.

5. The intake manifold of claim 4, wherein a second adapter element is secured to a bottom interior side wall of the non-metal housing.

6. The intake manifold of claim 5, wherein a third adapter element is secured to the top interior side wall and a fourth adapter element is secured to the bottom interior sidewall.

7. An intake manifold of an internal combustion engine, the intake manifold comprising:
a non-metal housing including an inlet and an outlet;
a charge air cooler disposed in the housing between the inlet and the outlet;
at least one metal housing frame carried by the charge air cooler; and
at least one connection between the at least one metal housing frame and the non-metal housing, each connection defined by:
a non-metal mounting adapter; and
a metal adapter holding plate secured to the at least one metal housing frame and holding the non-metal mounting adapter to the charge air cooler;
wherein each adapter element is secured to an interior side of a wall of the non-metal housing, and
wherein each metal adapter holding plate is elongated in a direction extending from the inlet to the outlet and has a U-shape profile.

8. The intake manifold of claim 7,
wherein the U-shape profile of each metal adapter holding plate includes a tension portion formed between first and second connecting arms, and
wherein both of the first and second connecting arms are parallel to a corresponding facing surface of the frame and secured to the corresponding facing surface of the frame.

9. The intake manifold of claim 8, wherein the tension portion of the metal adapter holding plate includes a central portion receiving an inwardly protruding portion from the interior side wall of the non-metal housing to secure the non-metal mounting adapter.

10. The intake manifold of claim 7, wherein the at elast one metal housing frame includes an upper frame at an upper end of the charge air cooler and a lower frame at a lower end of the charge air cooler.

11. The intake manifold of claim 10, wherein the at least one connection includes a plurality of connections.

12. The intake manifold of claim 10, wherein the at least one connection includes first and second connections between the at least one metal housing frame and the non-metal housing and third and fourth connections between the at least one metal housing frame and the non-metal housing.

* * * * *